United States Patent
Patoine et al.

(10) Patent No.: US 7,765,353 B2
(45) Date of Patent: Jul. 27, 2010

(54) SIMPLE IDENTIFICATION OF LOW-LEVEL SIGNALS BETWEEN CIRCUIT CARDS

(75) Inventors: Michel Patoine, Ashton (CA); Simon Creasy, Ottawa (CA)

(73) Assignee: Alcatel Lucent, Paris (FR)

( * ) Notice: Subject to any disclaimer, the term of this patent is extended or adjusted under 35 U.S.C. 154(b) by 99 days.

(21) Appl. No.: 12/060,477

(22) Filed: Apr. 1, 2008

(65) Prior Publication Data
US 2009/0248938 A1 Oct. 1, 2009

(51) Int. Cl.
*G06F 13/00* (2006.01)
(52) U.S. Cl. .................................. 710/302; 710/106
(58) Field of Classification Search ......... 710/300–306, 710/308–313, 104–105, 110
See application file for complete search history.

(56) References Cited

U.S. PATENT DOCUMENTS

| | | | |
|---|---|---|---|
| 5,719,512 A * | 2/1998 | Murayama | 327/159 |
| 6,529,974 B1 * | 3/2003 | Poujoulat et al. | 710/61 |
| 7,519,756 B2 * | 4/2009 | Yamamoto et al. | 710/302 |
| 7,533,208 B2 * | 5/2009 | Strangfeld et al. | 710/302 |
| 2002/0169912 A1 * | 11/2002 | Mills et al. | 710/301 |
| 2005/0066102 A1 * | 3/2005 | Yamamoto et al. | 710/301 |
| 2008/0104298 A1 * | 5/2008 | Liu | 710/301 |

\* cited by examiner

*Primary Examiner*—Raymond N Phan
(74) *Attorney, Agent, or Firm*—Marks & Clerk

(57) ABSTRACT

A method and apparatus are provided for conveying low level signals from a first circuit card to a second circuit card. The low level signals are encoded using a simple integer value N, and the low level signals are then communicated to the second circuit card as a sequence of N alternating values. A binary counter is used to generate the sequence of alternating values using the output of a single pin of the counter, although a second pin may be used to generate a clock signal. The invention allows all low level signals to be communicated in a robust yet simple way, minimizing the chance of spurious signals being generated upon hot insertion or extraction without complicated ad hoc solutions.

17 Claims, 3 Drawing Sheets

SIMPLE IDENTIFICATION OF LOW-LEVEL SIGNALS BETWEEN CIRCUIT CARDS

FIELD OF THE INVENTION

The invention relates to card-to-card signaling, and more particularly low level signaling during hot insertion and removal of circuit cards.

BACKGROUND OF THE INVENTION

Systems designed for hot insertion or removal of hardware must deal with a number of issues in order to prevent disruptions or errors from occurring due to freshly inserted or removed hardware. Fundamental electrical problems arise during hot insertion or removal, such as instantaneous load changes on the system power supply or instantaneous load changes on interconnected signals between circuit cards. Interconnected signals may also be disrupted by mechanical chattering when a circuit card's mating connector makes or breaks contact with the system. Signal disruption may also arise from the indeterministic behaviour of the electrical device driving or receiving the interconnected signal when its power supply is ramping-up during card insertion or when its power supply subsides during card removal. In addition, hot insertion or removal of cards may give rise to spurious behaviour on signals leading to their misinterpretation.

Such unpredictable signal behaviour is undesirable and can lead to system fault conditions, especially for low level signals. Low level signals are regular digital signals that are not encoded or protected in any way, and are used for basic functions such as card resets, circuit enables, and arbitration. Many solutions attempt to deal with each of the individual possible causes of signal disruption. For example, one or more recessed connector pins can be used to indicate that a card is fully inserted by detecting latent mating ground connections. The resultant signal acts as a qualifier for other signals or electrical circuits, essentially indicating that the card is fully inserted. This solution deals with mechanical connection problems. Another solution is to carefully select particular electrical circuits for driving or receiving interconnected signals.

While some of these solutions appear to be successful at addressing all the issues, problems often arise given the number of variables and the unpredictable behaviour of signals during transient states. Other solutions only address some of the issues, leaving other issues to chance.

A method which added integrity and robustness to the behaviour of low level signals in general, without being limited to particular signals or problems, would reduce spurious signals and allow more predictable behaviour of systems. Given the common nature of low level signals, such a method should also be simple and inexpensive.

SUMMARY OF THE INVENTION

In accordance with one aspect of the invention, a method of transmitting low-level signals from a first circuit card to a second circuit card is provided. An integer N is determined which corresponds to a low-level signal or combination of low-level signals to be transmitted, the integer N uniquely identifying the low-level signal or combination of low-level signals. A data sequence is transmitted from the first circuit card to the second circuit card, the data sequence being a series of N alternating values. A termination sequence is transmitted from the first circuit card to the second circuit card. The data sequence may be values of a bit from a binary counter.

In accordance with another aspect of the invention, a circuit card is provided. The circuit card includes a controlling entity for determining that a low-level signal or a combination of low-level signals is to be sent to a second circuit card. The circuit card also includes an encoder for transmitting a digital data signal to the second circuit card, the data signal including a data sequence and a termination sequence. The data sequence is a series of N alternating values where N is an integer uniquely identifying the low-level signal or combination of low-level signals.

In according with yet another aspect of the invention, a circuit card is provided which includes a receiving entity for receiving a low-level signal or combination of low-level signals from a second circuit card. The circuit card also includes a decoder for detecting and receiving a data signal from the second circuit card, the data signal including a data sequence and a termination sequence. The data sequence is a series of N alternating values, N being an integer which uniquely identifies the low-level signal or combination of low-level signals. The decoder identifies the low-level signal or combination of low-level signals to the receiving entity based on the value of N.

The methods of the invention may be stored as processing instructions on computer-readable media.

The methods and apparatus of the present invention provide a simple solution for avoiding spurious signals upon hot insertion and removal of circuit cards, and provide robustness in that any low level signals which are legitimately transmitted between cards are correctly delivered. By using an encoding technique for low level signals, it is highly improbable for a given signaling condition to be inadvertently replicated during the various error conditions and noise which can occur during transient states. The use of encoding also allows a combination of signals to be communicated over a 2-wire interface as a single coded sequence and the total number of signals required is reduced, which reduces the overall susceptibility to spurious signal problems.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
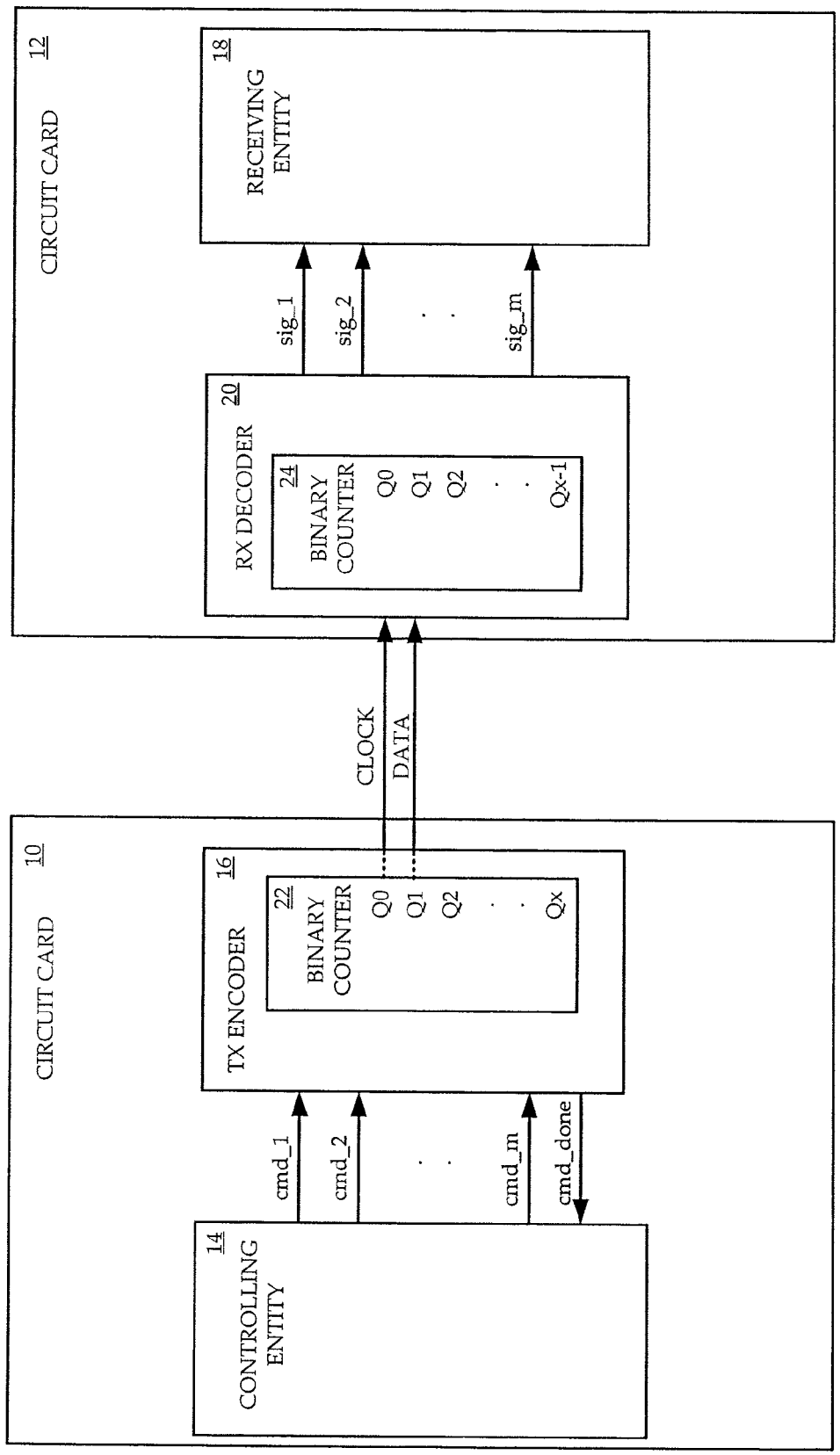
FIG. 1 is a diagram of communication components of two circuit cards exchanging low level signals according to one embodiment of the invention.

Referring to FIG. 1, communication components of two circuit cards which exchange low level signals is shown according to one embodiment of the invention. A first circuit card 10 sends low level signals to a second circuit card 12. The first circuit card 10 includes a controlling entity 14 and a transmit encoder 16. The second circuit card 12 includes a receiving entity 18 and a receive decoder 20. The receive decoder 20 acts as a receiver for low level signals conveyed from the transmit encoder. The transmit encoder 16 includes a first binary counter 22 and the receive decoder 20 includes a second binary counter 24.

Figure 2:
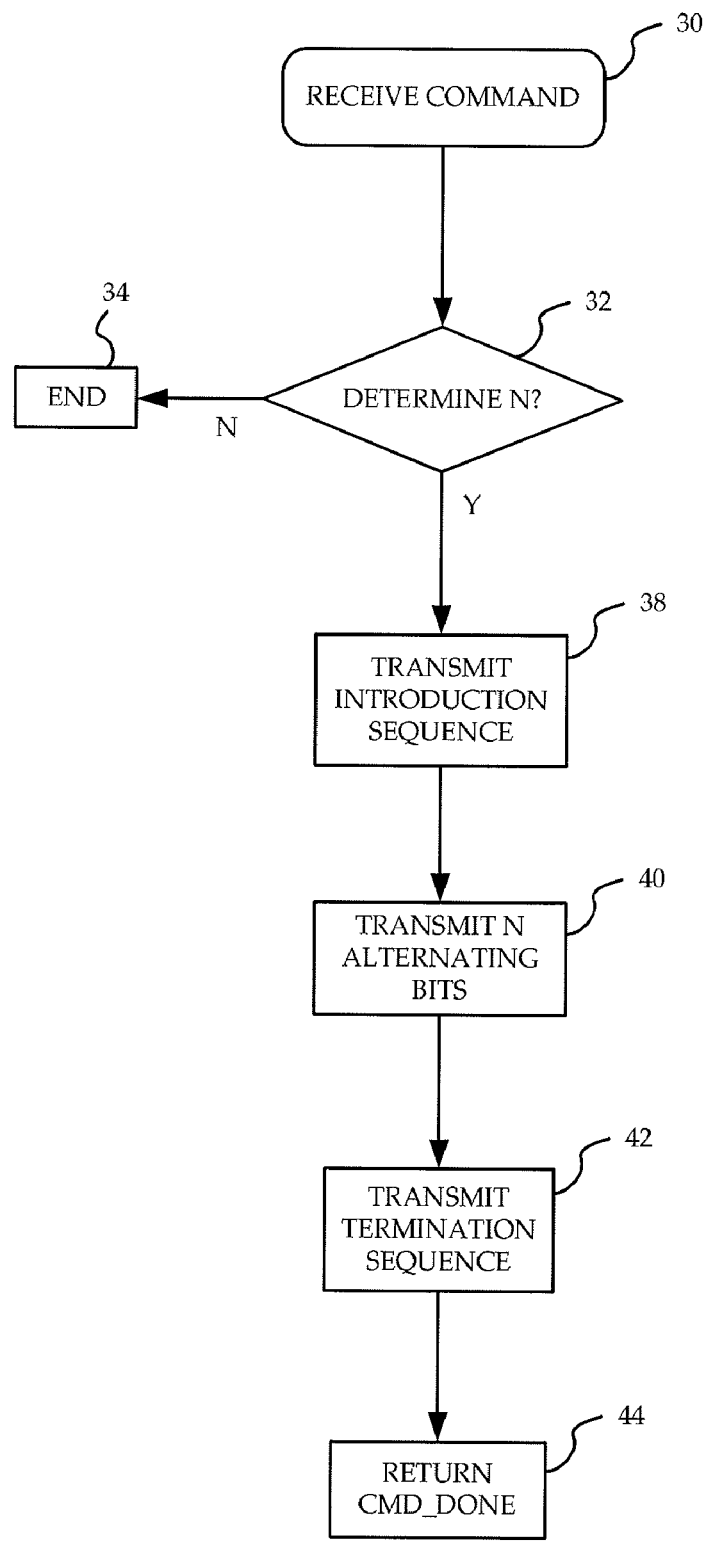
FIG. 2 is a flowchart of a method carried out by the transmit encoder of FIG. 1 to send low level signals to the second circuit card according to one embodiment of the invention.

Referring to FIG. 2, a flowchart of a method carried out by the transmit encoder 16 to send low level signals to the second circuit card 12 is shown according to one embodiment of the invention. At step 30 the encoder 16 receives a command from the controlling entity 14. The command is generally instructions to transmit a single low level signal or a combination of low level signals. At step 32 the encoder 16 attempts to determine a value N corresponding to the command received at step 30 is a valid command. The value of N is a parameter that will be used in encoding the command when it is sent to the second circuit card. The encoder 16 may determine the value N corresponding to the command in any way, such as a hardware encoding relating a numerical identifier of the command with the value N. Each different type of command which can be received from the controlling entity has a unique corresponding value of N. Or, more accurately since some commands may not be recognizable by the encoder 16, each different value of N which can be determined by the encoder 16 uniquely identifies a corresponding command. In this way each command can be encoded using a simple integer value N.

If the encoder 16 is unable to determine a value of N for the command at step 32, then the encoder takes no further action and ends treatment of the command at step 34. In one alternative the encoder 16 may signal at step 34 to the controlling entity 14 that the command was not recognized. If the encoder 16 is able to determine a value of N at step 32, then the encoder 16 can encode the command. At step 38 the encoder 16 transmits an introduction sequence to the second circuit card 12. At step 40 the encoder 16 transmits a data sequence to the second circuit card 12, the data sequence consisting of N consecutive bits of alternating value. At step 42 the encoder 16 transmits a termination sequence to the second circuit card 12. The introduction sequence, data sequence, and termination sequence are transmitted sequentially as a serial data signal.

Once the encoder 16 has transmitted the data signal, the encoder 16 may acknowledge to the controlling entity 14 at step 44 that the encoded command was transmitted to the second circuit card. The encoder 16 may accomplish this, for example, by automatically clearing the register bit that was used to communicate the command.

Returning to FIG. 1, the method described above with reference to FIG. 2 will be illustrated with reference to communication components of the two circuit cards 10 and 12. A particular implementation of transmission of the data signal will also be illustrated.

The controlling entity 14 sends a command signal cmd_1 to the transmit encoder 16. The command signal cmd_1 may be in any form, such as a hardware indication or a change to a software configurable register (step 30 of FIG. 2). The transmit encoder 16 determines a number of cycles N corresponding to the command signal (step 32 of FIG. 2).

The transmit encoder 16 communicates the command to the receive decoder 20 using two serial signals over two pins of the first binary counter 22, for example the pins Q0 and Q1. The binary counter 22 counts to an arbitrary number having a value of at least 2N+8−1. The lowest bit is transmitted to the receive decoder 20 over the first pin Q0 and is used as a clock signal. The binary counter 22 counts at a frequency determined by an arbitrary clock, such as the system clock of the first circuit card. For example, the binary counter 22 could toggle its count at half the frequency of the system clock. The clock signal generated by the lowest bit of the binary counter 22 is transmitted to a clock input of the second binary counter 24 on the second circuit card 12.

The second lowest bit of the binary counter 22 is transmitted to the receive decoder 20 using the second pin Q1 and is used as a data signal. The transmit encoder 16 masks the output of the second pin Q1 in order to generate an introduction sequence of "0"s for the duration of four or more consecutive bit counts (step 38 of FIG. 2). The transmit encoder 16 then halts masking the output of the second pin Q1 and allows transmission of the alternating data pattern over the second pin Q1 for a duration of 2N bit counts (step 40 of FIG. 2). The transmit encoder 16 then masks the output of the second pin Q1 in order to generate a terminating sequence of "0"s for the duration of four or more consecutive bit counts (step 42 of FIG. 2). The transmit encoder 16 may then send a confirmation signal cmd_done back to the controlling entity, confirming that the command has been transmitted to the second circuit card 12 (step 44 of FIG. 2). In the current embodiment, this is achieved by automatically clearing the register bit that was used to communicate the command.

Figure 3:
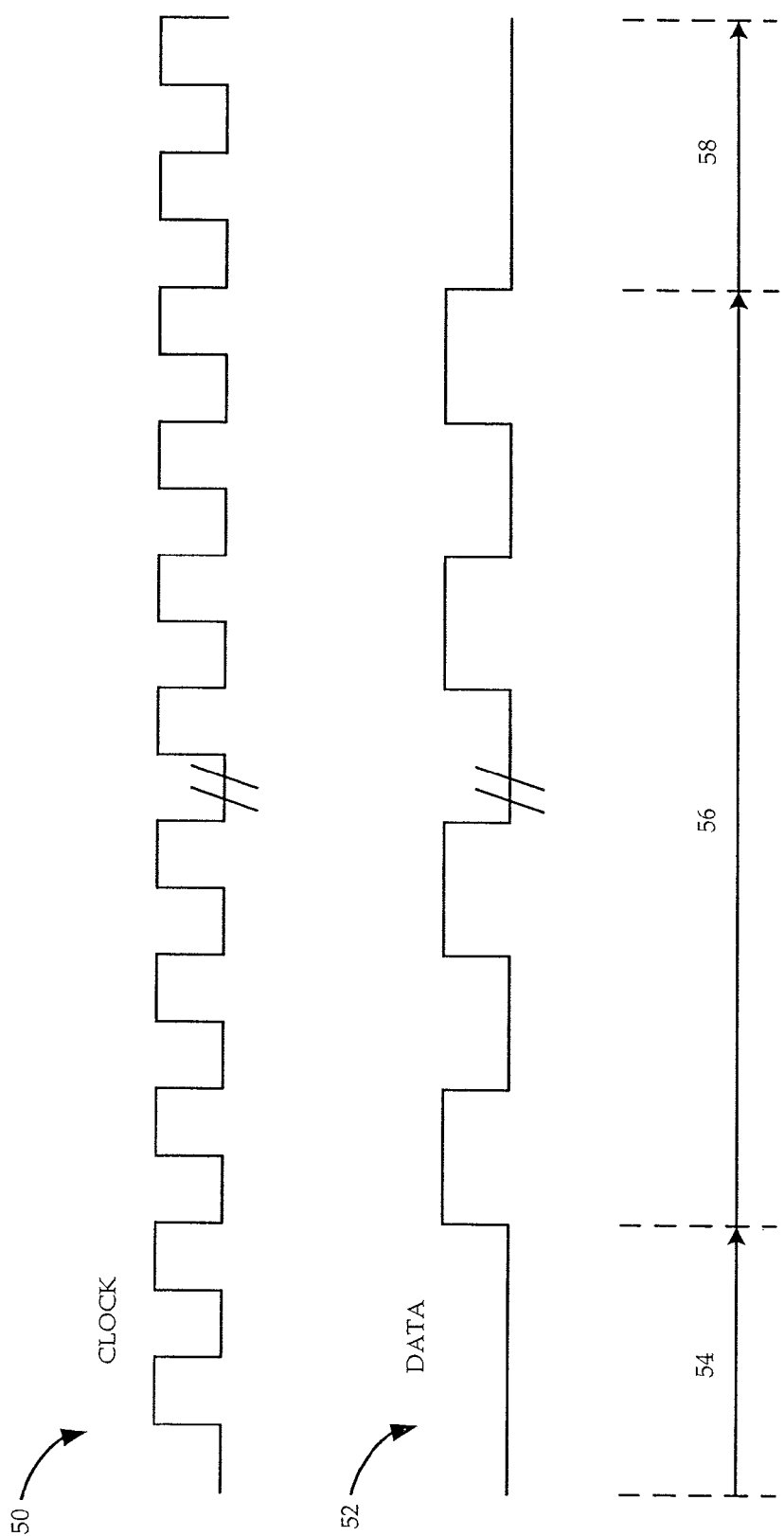
FIG. 3 is a diagram of two signals sent by the first circuit card of FIG. 1 according to one embodiment of the invention.

The effect of this is shown in FIG. 3. The output of the lowest bit of the binary counter 22 is an alternating series of "1"s and "0"s and can be used as a clock signal 50. The output of the second lowest bit of the binary counter 22 is used as a data signal 52, and consists of an introduction sequence 54, a data sequence 56, and a termination sequence 58. If viewed in terms of the frequency of the clock signal 50 rather than in terms of the bit counting, the introduction sequence 54 consists of two consecutive "0"s, the data sequence 56 consists of N alternative "1"s and "0"s, and the terminating sequence 58 consists of two consecutive "0"s.

The receive decoder 20 monitors the data signal 52 and the clock signal 50 received over its corresponding data and clock inputs. The reception of two or more consecutive "0"s on the data signal 52 with respect to the sampling edge on the clock signal 50 places the receiver in an initialized state with its binary counter 24 set to zero. Upon detection of an alternating pattern on the data signal 52, the receiver begins to increment the second binary counter 24. The second binary counter 24 counts and continues to increment for every alternating bit on the data signal 52 for which a sampling edge is provided on the clock signal 50. When an alternating pattern is detected as no longer present on the data signal 52, that is two or more consecutive "0"s or two or more consecutive "1"s are detected, the receiver determines the number N to which the second binary counter 24 counted. The receive decoder 20 determines the command corresponding to the number of cycles N, the command corresponding to the command sent from the controlling entity 14 to the transmit encoder 16. The receive decoder 20 then transmits this command to the receiving entity 18 as sig_1. If however the receive decoder 20 can not associate a command with the number of cycles N, then the receive decoder takes no action. In an alternate embodiment, the receive decoder 20 provides feedback to the controlling entity 14 if no association with a command and the number of cycles N can be made.

If the controlling entity 14 has a different or an additional low level signal to send to the receiving entity 18, a different command signal cmd_2 is sent to the transmit encoder 16. The transmit encoder 16 determines the value of $N_2$ corresponding to the command signal cmd_2, which will be different from the value N for the command signal cmd_1, and sends an introduction sequence, a data sequence of length $2N_2$ bits (or of length $N_2$ in the reference frequency of the clock signal), and a termination sequence to the receive decoder 20. The receive decoder detects the sequence of $N_2$ alternating "1"s and "0"s, determines the command corresponding to the number $N_2$, and transmits this command sig_2 to the receiving entity 18.

The invention has been described using the lowest bit of the first binary counter 22 as the clock signal 50. Alternatively, a separate clock signal shared by the transmit encoder 16 and the receive decoder 20 could be used. In such an embodiment, the output of the lowest bit of the first binary counter 22 is used as the data signal 52 as long as the sequence of outputs is synchronized with the clock signal. Since it is the lowest bit that is being used as the data signal, and hence to indicate N, the transmit encoder 16 need only transmit the output of the lowest pin of the binary counter 22 for a count of at least (N+4−1): two bits for the introduction sequence, N bits for the data sequence, and two bits for the termination sequence. However this may not be advantageous enough to warrant synchronization with an independent clock signal.

The invention has been described using an introduction code of two bits (with reference to the frequency of the clock signal) and a termination code of two bits (with reference to the frequency of the clock signal). Different introduction and termination sequences could be used, such as a different number of consecutive "0"s, or using consecutive "1"s instead of "0"s. In general, the invention finds advantage in transmitting a low level signal as a digital sequence consisting of an introduction sequence, a data sequence of N alternating values where N indicates the type of the low level signal or combination of low level signals, and a termination sequence which indicates that the data sequence is over. The introduction sequence and termination sequence can also be collapsed into a single sequence if deemed advantageous to do so for performance or other reasons, in that the termination sequence can initialize the receive decoder to begin monitoring for a new alternating sequence.

The invention has been described with the controlling entity 14 indicating to the transmit encoder 16 the type of low level signal or signals, and the transmit encoder 16 determining the number N of alternating bits which corresponds to the type of low level signal or signals. Alternatively the controlling entity 14 could contain the logic for determining the number N which corresponds to the type of low level signal or combination of signals. In such an embodiment, the command signals cmd_1 etc. simply convey a value of N to the transmit encoder 16. The transmit encoder 16 then simply transmits the introduction sequence, the data sequence of N alternating bits, and the termination sequence, without having to determine the value of N for a given low level signal. Similarly, the receive decoder 20 simply determines the value of N and passes this value to the receiving entity 18 as sig_1, and the receiving entity 18 then determines which low level signal or combination of signals is signified by this value N. This embodiment allows more general use of the invention, particularly as new low level signals or combinations of low level signals may be programmed into the logic of the controlling entity 14 and the receiving entity 18 without having to change hardware of the transmit encoder 16 and receive decoder 20. Further alternatives may be used, such as intermediate components which translate a low level signal received from the controlling entity 14 to a value of N sent to the transmit encoder 16. The method described above with reference to FIG. 2 may be carried out by any component on the first circuit card 10, or by any combination of components on the first circuit card 10. In general, the invention envisions any conveyance of a command, the command being a low level signal or combination of low level signals, from a first circuit card to a second circuit card using a digital sequence of N alternating bits which uniquely define the command, thereby encoding the command into a serial data signal.

The invention has been described as a controlling entity on a first circuit card conveying low level signals to a single receiving entity on a single second circuit card. Alternatively, the transmit encoder on the first circuit card could transmit the low level signals of the controlling entity to more than one receiving entity, located on one or more circuit cards. Each receiving entity could be sensitive to common commands, as well as commands specific to the receiving entity or specific to the card on which the receiving entity is located.

The invention is preferably implemented as hardware on the transmit encoder and the receive decoder. The invention may alternatively be implemented as software or hardware on some or all of the devices within FIG. 1, or as a combination of software and hardware. If in the form of software, the logical instructions may be stored on a computer-readable medium.

The embodiments presented are exemplary only and persons skilled in the art would appreciate that variations to the embodiments described above, such as methods logically equivalent to that described with reference to FIG. 2, may be made without departing from the spirit of the invention.

We claim:

1. A method of transmitting low-level signals from a first circuit card to a second circuit card, comprising:
   determining an integer N corresponding to a low-level signal or a combination of low-level signals to be transmitted, the integer N uniquely identifying the low-level signal or combination of low-level signals;
   transmitting a data sequence from the first circuit card to the second circuit card, the data sequence being a series of N alternating values, transmitting of the data sequence comprising transmitting values of a bit from a binary counter, and transmitting a termination sequence from the first circuit card to the second circuit card.

2. The method of claim 1 further comprising transmitting a clock signal from the first circuit card to the second circuit card, and wherein the data sequence and the termination sequence are synchronized with the clock signal.

3. The method of claim 1 further comprising:
   upon reception of the termination sequence by the second circuit card, initializing a receiver of the second circuit card for detection of a new data sequence,
   and wherein the second circuit card detects a new data sequence upon detection of an alternating sequence following reception of the termination sequence.

4. The method of claim 1 wherein transmitting the termination sequence comprises transmitting at least two consecutive bits having the same value.

5. The method of claim 1 further comprising:
   transmitting an introduction sequence from the first circuit card to the second circuit card; and
   upon reception of the introduction sequence by the second circuit card, initializing a receiver of the second circuit card for detection of the data sequence.

6. The method of claim 2 wherein transmitting a clock signal comprises transmitting a clock signal separate from the binary counter, and wherein the values of the bit from the binary counter which make up the data sequence are the values of the lowest bit of the binary counter.

7. The method of claim 2 wherein the clock signal is the output of the lowest bit of the binary counter, and wherein the data sequence is the output of the second lowest bit of the binary counter such that the alternating values making up the data sequence are each two bits in length as measured relative to the lowest bit of the binary counter.

8. The method of claim 7 wherein the termination sequence is also the output of the second lowest bit of the binary counter but the output of the second lowest bit is masked during transmission of the termination sequence.

9. The method of claim 5 wherein transmitting an introduction sequence comprises transmitting at least two consecutive bits having the same value.

10. A circuit card comprising:
a controlling entity for determining that a low-level signal or a combination of low-level signals is to be sent to a second circuit card;
an encoder for transmitting a digital data signal to the second circuit card, the data signal including a data sequence and a termination sequence, the data sequence being a series of N alternating values, N being an integer uniquely identifying the low-level signal or combination of low-level signals; and a binary counter, and wherein the encoder transmits the data sequence as the output of one of the pins of the binary counter.

11. The circuit card of claim 10 wherein communication between the two circuit cards is enabled by a clock signal transmitted separately of the binary counter, and wherein the data sequence is the output of the pin for the lowest bit of the binary counter.

12. The circuit card of claim 10 wherein the controlling entity transmits a command to the encoder, the command being unique to the low-level signal or combination of low-level signals, and wherein the encoder determines the value of N.

13. The circuit card of claim 10 wherein the controlling entity determines the value of N and transmits this value to the encoder.

14. The circuit card of claim 10 wherein the encoder transmits the termination sequence as at least two consecutive bits having the same value.

15. The circuit card of claim 10 wherein the data signal further includes an introduction sequence of at least two consecutive bits having the same value.

16. The circuit card of claim 10 wherein the encoder transmits the output of the pin for the lowest bit of the binary counter to the second circuit card as a clock signal, and wherein the encoder transmits the output of the pin for the second lowest bit as the data sequence.

17. The circuit card of claim 16 wherein the encoder also transmits the termination sequence as the output of the pin for the second lowest bit of the binary counter but masks the output during transmission of the termination sequence.

* * * * *